United States Patent
Banerjee et al.

(10) Patent No.: US 8,589,544 B2
(45) Date of Patent: Nov. 19, 2013

(54) SYSTEM AND METHOD FOR PROVIDING A SCRIPT-BASED COLLECTION FOR DEVICES IN A NETWORK ENVIRONMENT

(71) Applicants: Pradeep K. Banerjee, Los Gatos, CA (US); Shyyunn Sheran Lin, San Jose, CA (US); Ammar Rayes, San Ramon, CA (US); Gregory S. Thompson, Greensboro, NC (US); Subrata Dasgupta, San Jose, CA (US); Virendra K. Malaviya, Cupertino, CA (US); James McDonnell, Pleasanton, CA (US)

(72) Inventors: Pradeep K. Banerjee, Los Gatos, CA (US); Shyyunn Sheran Lin, San Jose, CA (US); Ammar Rayes, San Ramon, CA (US); Gregory S. Thompson, Greensboro, NC (US); Subrata Dasgupta, San Jose, CA (US); Virendra K. Malaviya, Cupertino, CA (US); James McDonnell, Pleasanton, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 13/671,209

(22) Filed: Nov. 7, 2012

(65) Prior Publication Data

US 2013/0067078 A1 Mar. 14, 2013

Related U.S. Application Data

(63) Continuation of application No. 12/848,146, filed on Jul. 31, 2010, now Pat. No. 8,332,511.

(51) Int. Cl.
*G06F 15/16* (2006.01)

(52) U.S. Cl.
USPC ........................................................ 709/224

(58) Field of Classification Search
None
See application file for complete search history.

(56) References Cited

U.S. PATENT DOCUMENTS

| 5,905,725 | A | 5/1999 | Sindhu et al. |
| 6,006,318 | A | 12/1999 | Hansen et al. |
| 6,138,219 | A | 10/2000 | Soman et al. |
| 6,160,819 | A | 12/2000 | Partridge et al. |
| 6,178,517 | B1 | 1/2001 | Bertin et al. |
| 6,272,547 | B1 | 8/2001 | McWilliams |
| 6,405,286 | B2 | 6/2002 | Gupta et al. |
| 7,089,306 | B2 | 8/2006 | Thorpe et al. |
| 7,296,112 | B1 | 11/2007 | Yarlagadda et al. |
| 7,389,341 | B2 | 6/2008 | Cornelius et al. |
| 7,606,887 | B1 | 10/2009 | Stewart et al. |
| 7,865,603 | B2 | 1/2011 | Braddy et al. |
| 8,332,511 | B1 | 12/2012 | Banerjee et al. |
| 2002/0053001 | A1 | 5/2002 | Miura et al. |
| 2003/0052885 | A1 | 3/2003 | Hampel et al. |
| 2003/0145081 | A1 | 7/2003 | Lau et al. |
| 2006/0190579 | A1 | 8/2006 | Rachiniowski et al. |

(Continued)

OTHER PUBLICATIONS

Adiseshu, Hari, et al., "A Reliable and Scalable Striping Protocol," Department of Computer Science, Washington University, St. Louis, MO, Computer Communication Review, a publication of ACM SIGCOMM, vol. 26, No. 4, ISSN #01464833, Oct. 1996, 11 pages; http://conferences.sigcomm.org/sigcomm/1996/papers/adiseshu.pdf.

(Continued)

*Primary Examiner* — Scott Christensen
(74) *Attorney, Agent, or Firm* — Patent Capital Group (57) ABSTRACT

A method is provided in one example and includes verifying a storage capacity of a network element coupled to an end device over a network connection. The method also includes executing script provided in the network element, which is configured for exchanging packets in a network environment. The script initiates a collection of data being retrieved from the end device. The data can be Fault, Configuration, Accounting, Performance, and Security (FCAPS) data associated with the end device. The data collected from the end device is communicated to a next destination.

17 Claims, 5 Drawing Sheets

(56) References Cited

U.S. PATENT DOCUMENTS

| | | |
|---|---|---|
| 2006/0230309 A1 | 10/2006 | Kromer et al. |
| 2006/0271656 A1 | 11/2006 | Yagawa |
| 2009/0119280 A1 | 5/2009 | Waters et al. |
| 2009/0222541 A1 | 9/2009 | Monga et al. |
| 2010/0131582 A1 | 5/2010 | Driscoll et al. |
| 2010/0223382 A1 | 9/2010 | Rayes |
| 2010/0229096 A1 | 9/2010 | Maiocco et al. |

OTHER PUBLICATIONS

Bennett, Jon C. R., "Packet Reordering is Not Pathological Network Behavior," vol. 7, No. 6, IEEE/ACM Transactions on Networking, Dec. 1999, pp. 789-798; 10 pages http://copilotco.com/mail-archives/freenet-dev.2007/pdfiR7rCzMOTC.pdf.

"Simple Network Management Protocol (SNMP), MIBS and SMI, MPLS Tutorial," [Retrieved and printed Dec. 11, 2012] http://mplstutorial.com/simple-network-management-protocol-snmp-mibs-and-s; 9 pages.

USPTO Jun. 23, 2011 Final Rejection from U.S. Appl. No. 12/395,221.

USPTO Sep. 22, 2011 Request for Continued Examination in response to Jun. 23, 2011 Final Rejection from U.S. Appl. No. 12/395,221.

USPTO Mar. 12, 2012 Non-Final Office Action from U.S. Appl. No. 12/848,146.

USPTO Jun. 8, 2012 Response to Non-Final Office Action mailed Mar. 12, 2012 from U.S. Appl. No. 12/848,146.

USPTO Aug. 10, 2012 Notice of Allowance from U.S. Appl. No. 12/848,146.

USPTO Jan. 28, 2013 Final Rejection from U.S. Appl. No. 12/395,221.

SYSTEM AND METHOD FOR PROVIDING A SCRIPT-BASED COLLECTION FOR DEVICES IN A NETWORK ENVIRONMENT

RELATED APPLICATION

This Application is a continuation (and claims the benefit of priority under 35 U.S.C. §120) of U.S. application Ser. No. 12/848,146, filed Jul. 31, 2010, entitled "SYSTEM AND METHOD FOR PROVIDING A SCRIPT-BASED COLLECTION FOR DEVICES IN A NETWORK ENVIRONMENT," Inventor(s) Pradeep K. Banerjee, et al. The disclosure of the prior application is considered part of (and is incorporated by reference in) the disclosure of this application.

TECHNICAL FIELD

This disclosure relates in general to the field of communications and, more particularly, to providing a script-based collection for devices in a network environment.

BACKGROUND

Networking architectures have grown increasingly complex in communication environments. Device manufacturers have added instrumentation and features to augment performance in the network. For example, Fault, Configuration, Accounting, Performance, and Security (FCAPS) is the ISO Telecommunications Management Network model and framework for network management. FCAPS reflects management categories into which the ISO model defines network management tasks. As network systems have become more sophisticated, processing demands have significantly increased, which has fostered more and more external network appliances being provisioned in the network. Such external network appliances are expensive and, further, translate into more overhead, more coordination, and more managerial oversight being needed. Hence, the ability to offer important network features economically and pragmatically presents a significant challenge to component manufacturers, network operators, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes verifying a storage capacity of a network element coupled to an end device over a network connection. The method also includes executing script provided in the network element, which is configured for exchanging packets in a network environment. The script initiates a collection of data being retrieved from the end device. The data can be Fault, Configuration, Accounting, Performance, and Security (FCAPS) data associated with the end device. The data collected from the end device is communicated to a next destination.

In more specific embodiments, the script interacts with a scheduler module in order to initiate the collection of the data, where the data is collected at periodic intervals. The FCAPS data can be parsed at the next destination such that a report is generated relating to the FCAPS data. The FCAPS data can include simple network management protocol (SNMP) management information base (MIB) data. The network element can initiate a collection of additional FCAPS data using a master scheduling script. The master script is configured to parse a seed file that contains selected end devices from which the additional FCAPS data is to be collected. The script can parse an inventory configuration file (ICF) to gather a set of command line interface (CLI) commands associated with a selected end device targeted for collection activities.

Example Embodiments

Figure 1:
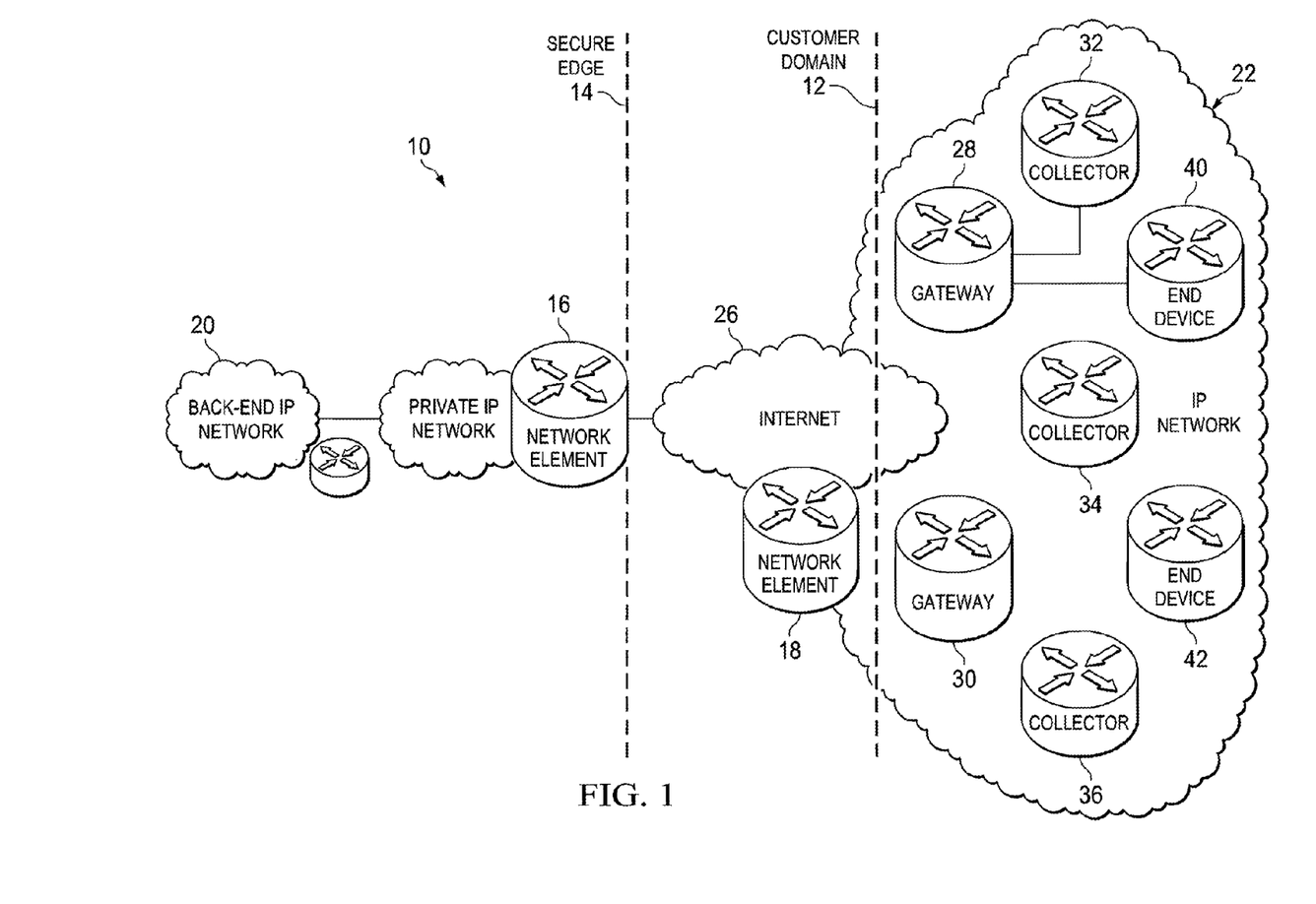
FIG. 1 is a simplified block diagram of a communication system for providing a script-based collection for devices in a network environment in accordance with one embodiment of the present disclosure.

Turning to FIG. 1, FIG. 1 is a simplified block diagram of a communication system 10 for providing a script-based collection for devices in a network environment. In this particular example, FIG. 1 may include a customer domain 12 and a secure edge 14. This particular example also includes a network element 16, a network element 18, a back-end Internet protocol (IP) network 20, and an IP network 22. A private IP network may be provisioned between network element 16 and IP network 20. An Internet 26 may traverse secure edge 14 and customer domain 12. In this particular arrangement, there are two gateways 28 and 30 provisioned in the network. Each of gateways 28 and 30 may interface with one or more collectors 32, 34, and 36. Collectors 32, 34, and 36 could readily be included within gateways 28 and 30 in alternative embodiments. Collectors 32, 34, and 36 can be embedded at any location, and suitably interface with a set of end devices 40 and 42 to collect information. The collected information may be sent back to gateways 28 and 30 for additional processing, as detailed below.

In one particular instance, communication system 10 can be associated with a smart service deployment in which particular types of data (e.g., fault, configuration, accounting, performance, and security (FCAPS) data) is systematically collected from devices in the network. In other examples, communication system 10 would be equally applicable to other collection environments such as those that only cover one of the categories associated with performance, security, accounting, etc. for the network. Communication system 10 may include a configuration capable of transmission control protocol/internet protocol (TCP/IP) communications for the transmission and/or reception of packets in a network. Communication system 10 may also operate in conjunction with a user datagram protocol/IP (UDP/IP) or any other suitable protocol, where appropriate and based on particular needs.

For purposes of illustrating certain example techniques of communication system 10, it is important to understand the communications that may be traversing the network. The following foundational information may be viewed as a basis from which the present disclosure may be properly explained. Typically, smart services can provide a proactive intelligence-based solution to end users (e.g., IT administrators), who can readily monitor networks and core devices for security, performance, and diagnostic information. For example, FCAPS data can be collected and used to recognize areas of failure or weakness in a network. Smart services collect critical inventory and FCAPS related data (e.g., including simple network management protocol (SNMP) management information base (MIB) data, outputs of command line interface (CLI) commands, Syslog messages, etc.). Such collected information can be sent to a back-end system to parse, profile, analyze, and/or convey the network data to designated entities and/or individuals (e.g., through alerts, through periodic reports, etc.).

Collection solutions are commonly deployed on multiple external appliances that include a server (e.g., Solaris, Linux, etc.) or a personal computer (e.g., through Windows). Solutions that include an external appliance are expensive to deploy, to support, and to maintain. Additionally, external appliance solutions do not scale well for the designated number of customers allocated for smart services.

In accordance with one example implementation, communication system 10 can resolve the aforementioned issues associated with expensive and cumbersome architectures that attempt to collect network data. More specifically, communication system 10 offers an appliance-less script-based collection solution for smart services, where such a solution can be deployed on existing gateways, routers, switches, etc. The framework can allow for the collection of FCAPS information from a network having an embedded collector, which occupies a distributed role for multiple end devices. Such a protocol also represents an intelligent collection approach that is minimally disruptive and that is not based on Internetwork Operating System (IOS) modifications. Additionally, communication system 10 can collect inventory data without requiring a dedicated appliance. The architecture fosters a distribution of script/tool command language (TCL) code from a single gateway node to various internal devices, which can operate as script-based collectors. Such a configuration would offer a distributed collection scheme in a scripting language with nominal user involvement (i.e., except for the initial gateway interaction). Certain embodiments may also allow for a graphic viewing of router error messages in a utility without the need for a person to log into a given device. Note that such operations can dramatically reduce the complexity and the cost of deploying a collection solution for smart services.

From a practical standpoint, communication system 10 can achieve an effective integration into a company's back-end systems. The can improve the full lifecycle of product management from business aspects (e.g., asset management) through technical diagnostics (e.g., network management system (NMS) activities). Note that most NMS frameworks are appliance-based in their collection mechanisms. Moreover, the proposed architecture can be important for services and network management applications, as collected data is critical for any FCAPS-based system. The strategy discussed herein for data collection significantly simplifies deployment scenarios, which stands in contrast to external collection systems (e.g., appliances, agents, etc.), which create unnecessary expenditures, overhead, and management responsibilities.

It should also be noted that communication system 10 can allow a network management company to limit the number of appliances being purchased and managed in a network. This is due to the embedded capabilities of the discussed collection elements, which can intelligently capture real-time parameters for end devices. Additionally, the discussed architecture can offer an appliance-less device verification process, where reports can be systematically generated for the existing software image number, memory spaces, etc. without connecting (e.g., Telneting) to each device (often from a server/appliance). Only a nominal connection with the gateway is utilized to achieve the collection activities of the present disclosure. As a separate notion, the proposed architecture is easily scalable because multiple gateways (and collector elements, which may be provisioned thereon) can be economically deployed in a network. Before discussing potential flows associated with the architecture of FIG. 1, a brief discussion is provided about some of the possible infrastructure that may be included in communication system 10.

End devices 40 and 42 represent devices from which collectors 32, 34, and/or 36 retrieve data. That collected data can be sent to any appropriate destination such as, for example, to back-end devices that can profile the data and offer intelligent reporting back to any interested entity (e.g., an IT manager, a network operator, etc.). End devices 40 and 42 can be any device sought to be monitored by a given individual or entity, where such end devices can include routers, switches, gateways, bridges, loadbalancers, firewalls, inline service nodes, proxies, servers, etc. In other instances, end devices 40 and 42 can be other computers, databases, or personal computing devices (e.g., phones of any kind, laptops, etc.).

IP networks 20 and 22 represent a series of points or nodes of interconnected communication paths for receiving and transmitting packets of information that propagate through communication system 10. IP networks 20 and 22 offer a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. IP networks 20 and 22 may implement a UDP/IP connection and use a TCP/IP communication language protocol in particular embodiments of the present disclosure. However, IP networks 20 and 22 may alternatively implement any other suitable communication protocol for transmitting and receiving data packets within communication system 10. Internet 26 can be used to facilitate communications between network components and/or other networks, as depicted in FIG. 1.

Gateways 28 and 30 (e.g., provisioned with collectors 32, 34, and/or 36) can execute a script in order to collect, tag, aggregate, and/or archive collected information. In addition, this collected information can then securely deliver the data to a back-end network (as shown in FIG. 1), where further analysis can be performed. The analyzed data can be accessible to a customer via a suitable interface (e.g., via a web portal (of a server), which can provide a concise view of the network installed base).

In one example implementation, gateways 28 and 30 are 108 devices supporting both PKI (i.e., crypto) and an embedded event manager (EEM)) feature. Note that in order to carry out the activities outlined herein, gateways 28 and 30 should have sufficient free local storage capacity. In a particular example, collectors 32, 34, and/or 36 are also 108 devices that can support EEM, PKI, and/or Telnet, where these collecting components should similarly have sufficient free local storage capacity to hold the collected inventory. Before launching types of script, an initial verification may occur for evaluating such memory capacities. The gateway and collector functionality can reside on the same device, or they can be distributed in two or more devices. For purposes of simplicity, certain embodiments presented herein assume that the same device acts as a gateway and a collector.

End devices 40 and 42 can support a CLI and/or an SNMP for interrogation or, alternatively, the approaches outlined herein can be used to collect information from any type of end devices having any suitable data exchange protocols (and/or interfaces) provided thereon. In certain example implementations, once suitable devices (being targeted for collection purposes) are identified, a user-friendly installation utility can aid an individual in deploying EEM policies to the selected devices. The particular utility can be scripted, or it can be deployed on a laptop for a temporary basis (e.g., for installation purposes).

Each gateway 28 and 30 can have a connection to a hosting environment (e.g., a secure processing server), where the gateways can orchestrate the inventory collection activities using a master scheduling script. The master script can be spawned via a cron-like timer (detailed below), where the master script parses a seed file (i.e., a manifest) that contains all the devices to be inventoried. Once the scheduler script parses the seed file, it spawns a collector control script for each device. An application layer within the device can be used to allow the script to be executed. The seed file can specify the device role. The seed file can further include login credentials, SNMP community strings, or any other suitable data segments, which may be based on particular configuration needs.

In operation, a given gateway can provide suitable installations of the collector script (e.g., code, logic, software, etc.) in internal devices that are designated for inventory collection. Additionally, gateways 28 and 30 can execute configuration checks to verify that the IP addresses in the seed files are reachable, the credentials are valid, etc. Gateways 28 and 30 can also be responsible for logging any errors, notifying the back-end devices of network events, and (optionally) alerting a lightweight utility mechanism (e.g., a help desk, an IT professional, etc.) of error messages. Gateways 28 and 30 can also verify their own internal capacities of memory space before proceeding with executing the script.

The control script can contact an associated collector (e.g., via secure shell (SSH)) and instruct the collector to launch a slave collection script to perform the actual inventory collection. The collection script can parse an Inventory Configuration File (ICF) to gather the set of CLI commands and MIBs to be collected for a given device. Telnet or SSH can be used to contact the device to collect the data. No scripts would actually run on the end device, where the end device only needs to support certain data propagation protocols (e.g., CLI, Telnet, SSH, etc.). Once the data collection completes, it can be transferred from the collector device to the gateway device via any suitable protocol (e.g., a secure copy (SCP) protocol, etc.).

The above procedure (i.e., spawn collector control, contact collector, spawn slave collection script, copy data to gateway, etc.) can be repeated for each device in the seed file. When the last device has been collected, the collection metrics can be recorded, where the entire inventory is archived via some CLI (or other adequate mechanisms). For example, an IOS archive CLI could create a tar file of the inventory. The inventory tar file can then be sent (securely) to the back-end of the network over any appropriate platform (e.g., via Hypertext Transfer Protocol Secure (HTTPS)). In the case of limited local storage on a given gateway, multiple archives can be created and sent to the back-end components individually. These transmissions can include the part number, and the total parts being relayed to the back-end, as part of the HTTPS URL.

Gateways 28 and 30, along with network elements 16 and 18, are network elements that facilitate data propagation in a given network (e.g., for networks such as those illustrated in FIG. 1). As used herein in this Specification, the term 'network element' is meant to encompass routers, switches, gateways, bridges, loadbalancers, firewalls, inline service nodes, proxies, servers, processors, modules, or any other suitable device, component, element, proprietary appliance, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information.

In one implementation, gateway 28 and/or gateway 30 include software to achieve (or to foster) the collection operations, as outlined herein in this Specification. Each of gateway 28 and/or gateway 30 can include a respective collector (e.g., collectors 32, 34, or 36), or the collector itself can be provisioned as an independent device. Note that in one example, each of gateway 28 and/or gateway 30 have an internal structure (e.g., a processor, a memory element, etc.) to facilitate some of the operations described herein. In other embodiments, these collection operations may be executed externally to these elements, or included in some other network element to achieve this intended functionality. Alternatively, gateway 28 and/or gateway 30 may include this software (or reciprocating software) that can coordinate with other network elements in order to achieve the operations, as outlined herein.

In operational terms, a lightweight utility (e.g., a help desk mechanism deployed in the computer) can readily be utilized to achieve certain teachings of the present disclosure. For example, a downloadable graphical user interface (GUI)-based utility can be used for encapsulating the EEM policy scripts for each device role. This utility can have the capability to import existing seed files, and provide a basic seed file editor. The utility can allow the user to designate devices for gateway and collector roles (e.g., using a tree view to present the organization in a hierarchical fashion). Upon receiving a call from the utility, the gateway can configure its own EEM timer events. The gateway is also able to capture error messages and to send them to the back-end components, where the error messages can be displayed to the utility in a graphical manner. This procedure eliminates the need for a person to log into a device and check the error logs. A syslog redirection can readily be incorporated into such activities.

Figure 2:
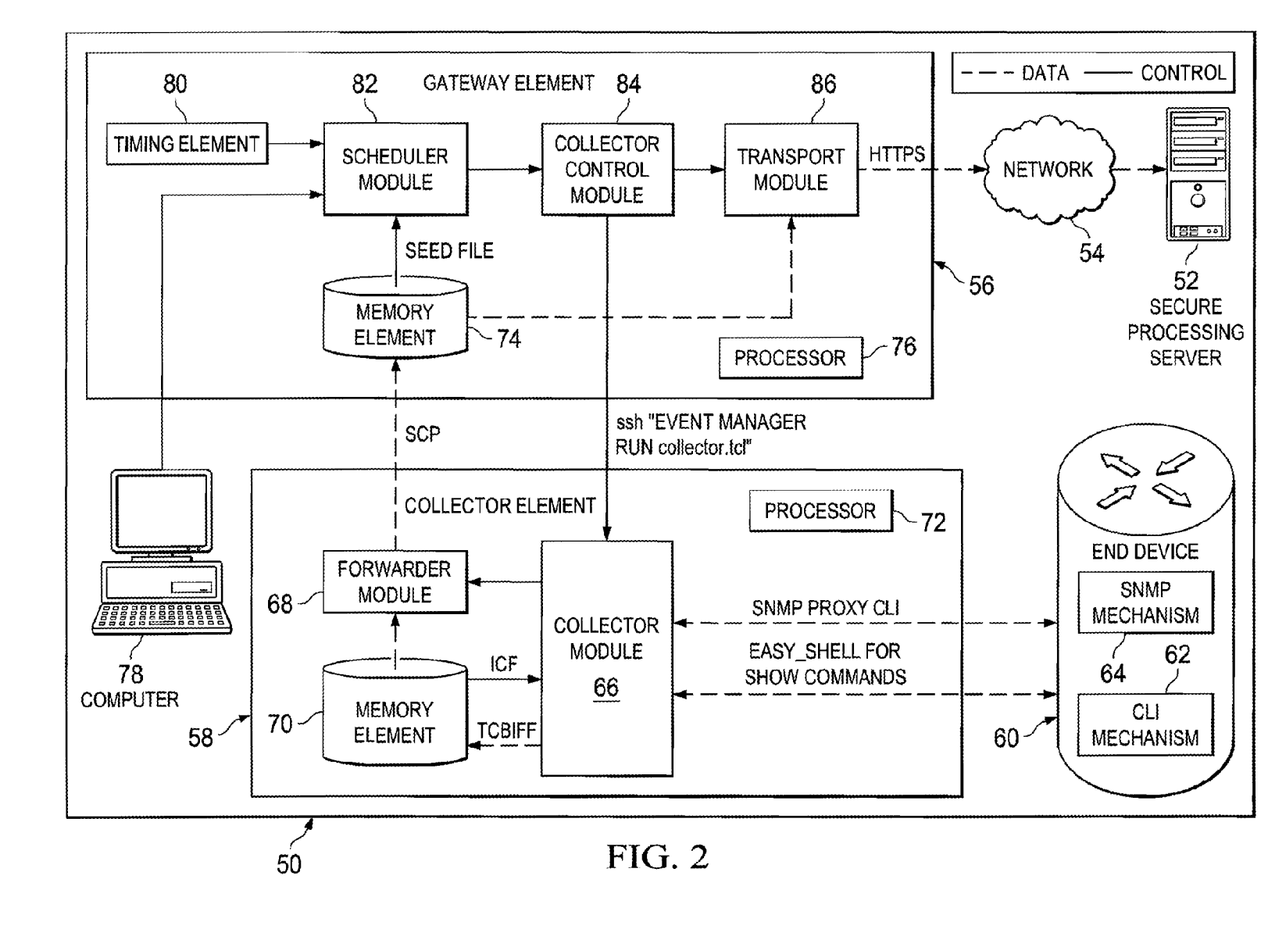
FIG. 2 is a simplified block diagram illustrating possible example details associated with the communication system.

Turning to FIG. 2, FIG. 2 is a simplified block diagram illustrating an example arrangement of a communication system 50 according to the present disclosure. Communication system 50 includes a secure processing server 52 that is coupled to a gateway element 56 over a network 54. Gateway element 56 is coupled to a collector element 58, which collects information from an end device 60. End device 60 includes a CLI mechanism 62, and an SNMP mechanism 64. Note that, for purposes of spacing and depiction (of the flows), collector element 58 is logically separated from gateway element 56 such that the steps can be clearly shown. However, this particular implementation involves these two elements being coincident, collocated, and residing on the same logical device.

Collector element 58 includes a collector module 66, a forwarder module 68, a memory element 70, and a processor 72. Gateway element 56 may include a memory element 74, a processor 76, a timing element 80, a scheduler module 82, a collector control module 84, and a transport module 86. A computer 78 may be configured to interface with scheduler module 82. Computer 78 can be representative of clients, customers, or end users wishing to initiate collection activities in communication system 50 via some network. For example, computer 78 could be used by an IT professional, a network administrator, or any other individual seeking to intelligently monitor the network. The term 'computer' is inclusive of devices used to initiate a communication such as a laptop, a personal digital assistant (PDA), an electronic notebook, a cellular telephone, an iPhone, a Blackberry, a smartphone, a tablet, an iPad, an IP phone, or any other device, component, element, or object capable of initiating data exchanges within communication system 10. Computer 78 may also be inclusive of a suitable interface to the human user, such as a display, or a keyboard or other terminal equipment. Note that computer 78 may also be any device that seeks to initiate a communication on behalf of another entity or element, such as a program, a database, or any other component, device, element, or object capable of initiating an exchange within communication system 10. Data, as used herein in this document, refers to any type of diagnostic data, FCAPS data, NMS data, numeric, voice, video, media, or script data, or any type of source or object code, or any other suitable information in any appropriate format that may be communicated from one point to another.

Figure 3:
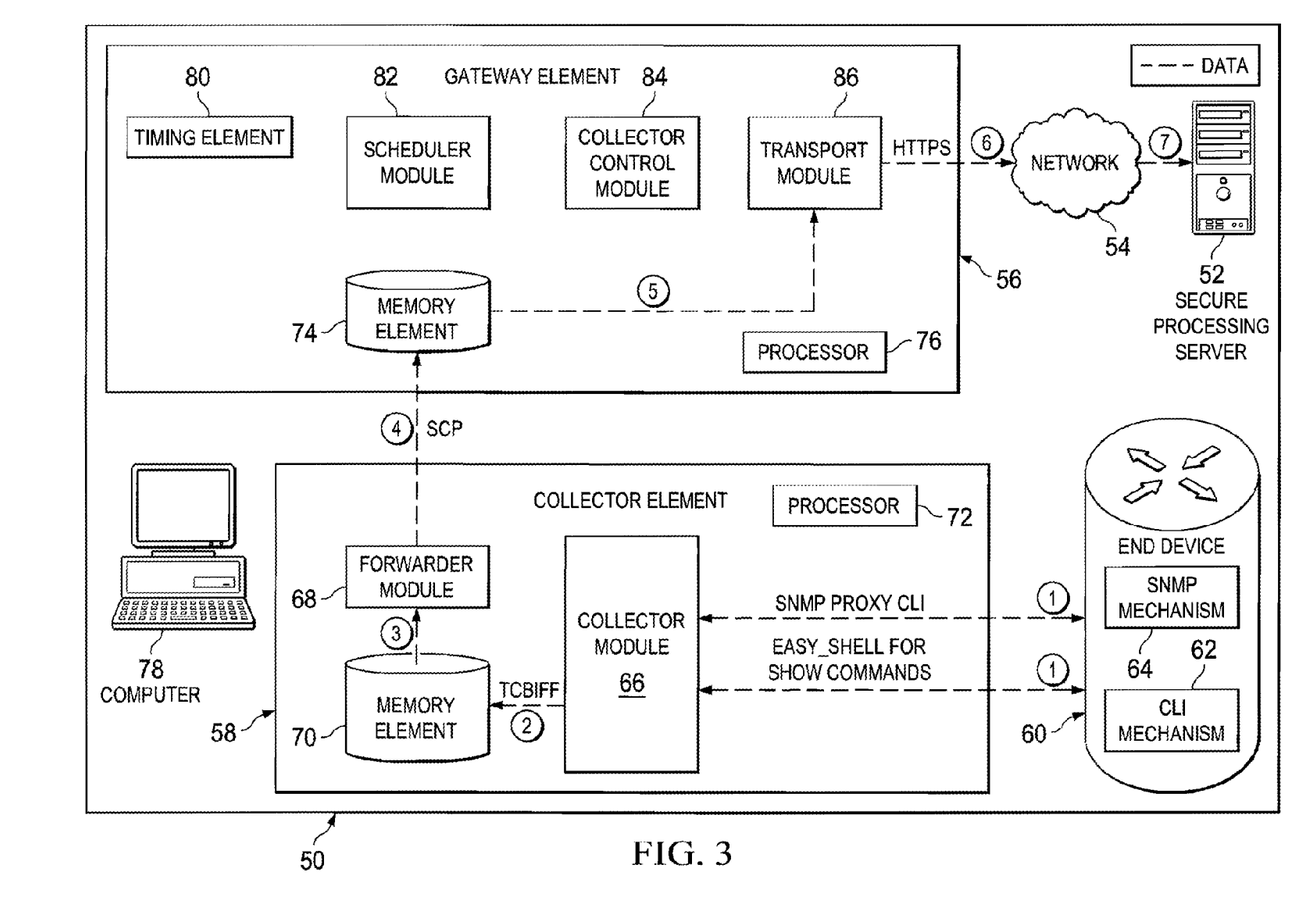
FIG. 3 is another simplified block diagram illustrating one potential operation associated with the present disclosure.

FIG. 3 is a simplified block diagram illustrating example signaling associated with the architecture of FIG. 2. FIG. 3 illustrates data plane transmissions between the components of FIG. 2. The flow may begin at step one, where information may be collected from end device 60. End device 60 may support a CLI and/or an SNMP interrogation. Collector module 66 may relay this collected information to memory element 70 at step two. One example format could include a TCBIFF being sent to memory element 70. At step three, memory element 70 may relay this information to forwarder module 68 of collector element 58. At step four, forwarder module 68 may relay this information to memory element 74 of gateway element 56. From memory element 74, this data may be sent to transport module 86 at step five. At step six, this information may be sent to network 54 using any appropriate format (e.g., HTTPS). At step seven, this information can be delivered to secure processing server 52.

Figure 4:
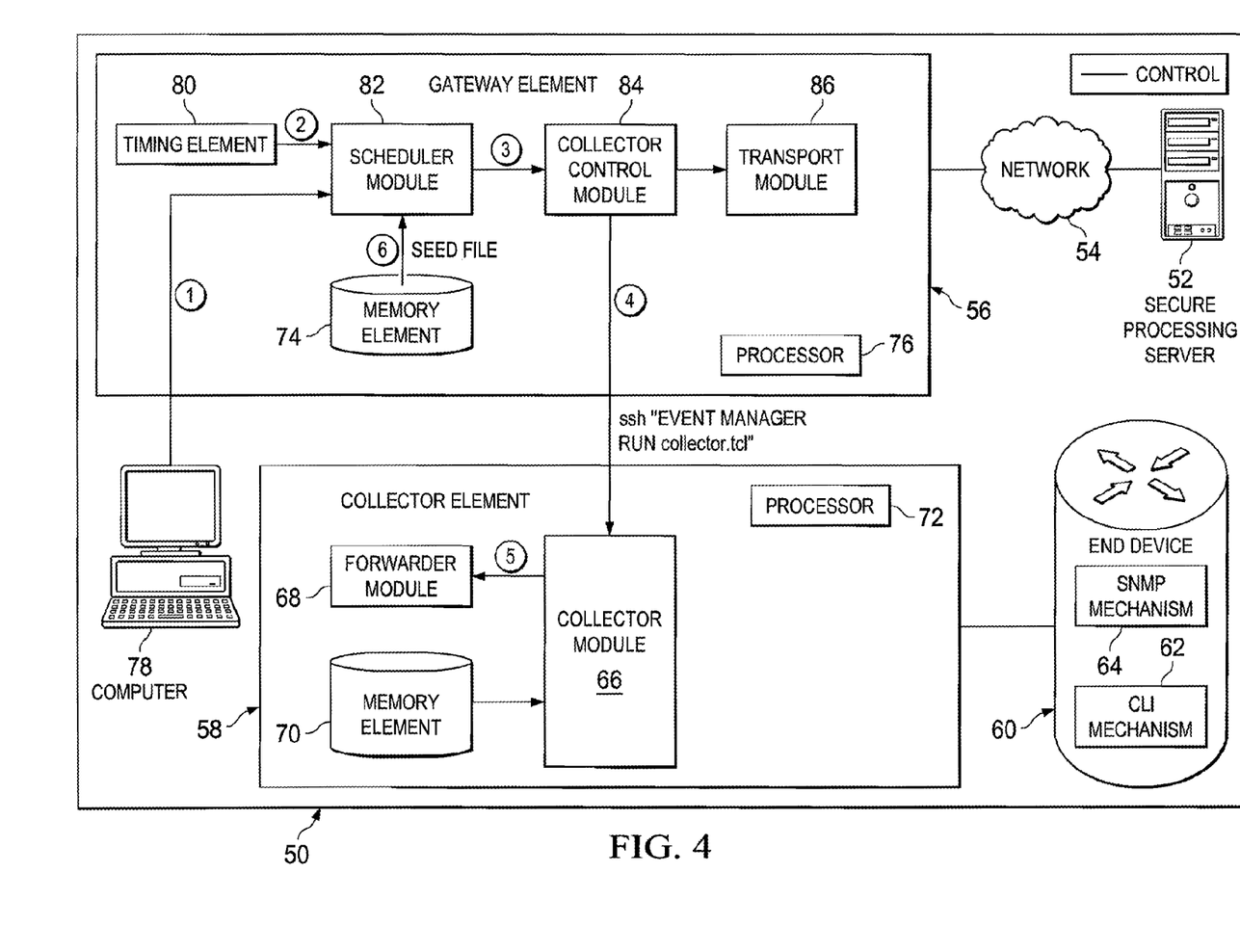
FIG. 4 is another simplified block diagram illustrating one potential operation associated with the present disclosure.

FIG. 4 is a simplified block diagram illustrating example signaling associated with the architecture of FIG. 2. The particular configuration of FIG. 4 depicts the control plane flow for communication system 50. The first step can involve computer 78 communicating commands to scheduler module 82. Note that this can involve timing element 80, which is configured to intelligently track time intervals for performing certain activities within communication system 50. Hence, at step two a time interval is triggered such that scheduler module 82 is initiated. At step three, collector control module 84 receives instructions from scheduler module 80, where collector element 58 is subsequently engaged. More specifically, collector module 66 of collector element 58 may receive a command from collector control module 84 (e.g., a SSH 'event manager run collector.tcl' command).

At this juncture, collector module 66 can interact with memory element 70 (where an ICF is subsequently returned), and also interact with forwarder module 68 (as indicated by step five). Forwarder module 68 can subsequently interface with memory element 74, which provides a seed file (shown in step six) to scheduler module 82. At this juncture, the collected information may be sent to any appropriate destination (e.g., over a network 54 to secure processing server 52).

Figure 5:
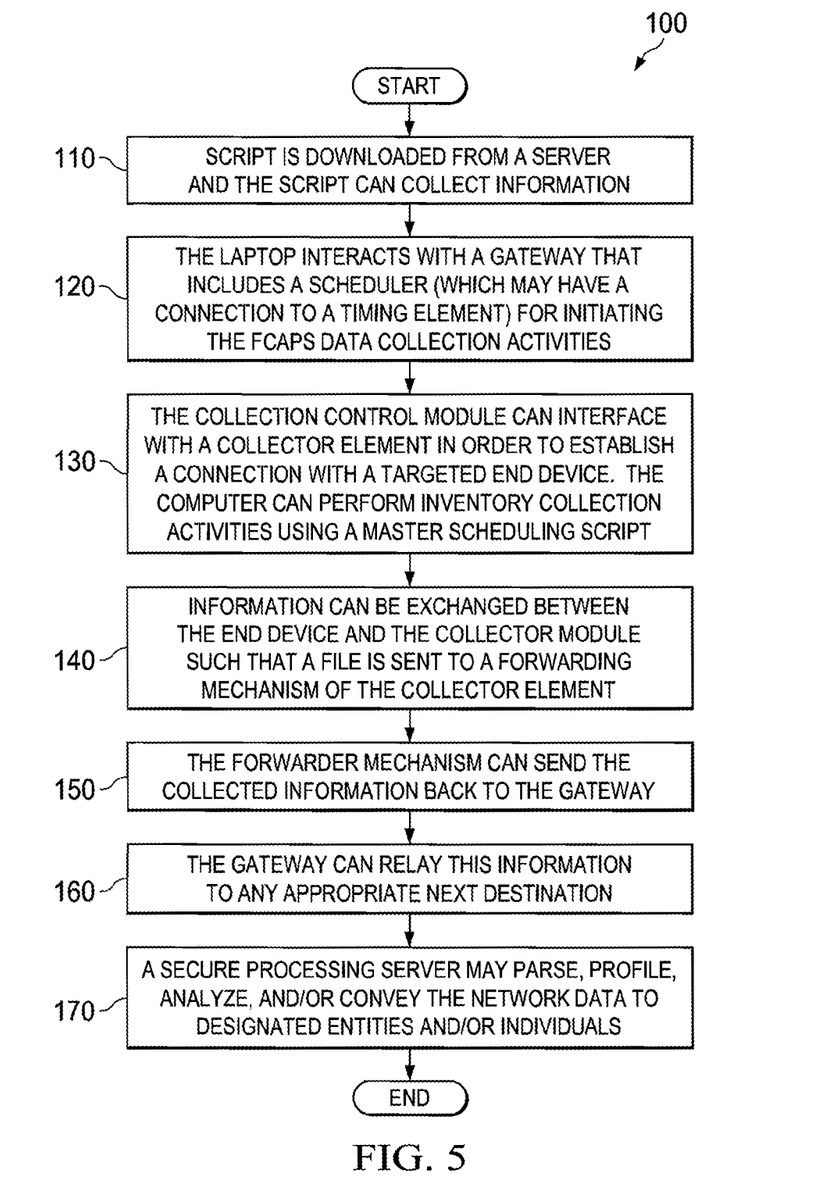
FIG. 5 is a simplified flowchart illustrating potential operations associated with the communication system.

FIG. 5 is a simplified flowchart 100 illustrating one generic operation associated with the present disclosure. The flow may begin at step 110, where script is downloaded from a server to a computer, which can install an instance of the script on a gateway device and (optionally) trigger a collection of additional FCAPS data from selected devices. For example, an individual can use his laptop to login to a website, and download script data to be used in collection activities for targeted end devices. At step 120, the laptop can then interact with a gateway that includes a scheduler (which may have a suitable connection to a timing element) for initiating the FCAPS data collection activities. For example, timing characteristics may include collecting specific types of data, at specific times, at periodic intervals, etc.

At step 130, the collection control module can interface with a collector element in order to establish a suitable connection with a targeted end device. Note that in particular embodiments, the computer can perform inventory collection activities using a master scheduling script. The master script can parse a seed file, which contains the devices to be inventoried. Once the scheduler script parses the seed file, it spawns a collector control script for each end device. Returning to this particular flow of FIG. 5, at step 140, information can be exchanged between the end device and the collector module such that a file is sent to a forwarding mechanism of the collector element.

At step 150, the forwarder mechanism can send the information back to the gateway. At step 160, the gateway can suitably relay this information to any appropriate next destination. For example, the collected FCAPS may be relayed to a secure processing server (or some other back-end system), which may suitably parse, profile, analyze, and/or convey the network data to designated entities and/or individuals (e.g., through alerts, through periodic reports, etc.). This is reflected by step 170.

Note that in certain example implementations, the intelligent collection functions outlined herein may be implemented by logic (i.e., script) encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 2] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, gateways 28, 30, and 56 may include software in order to achieve the intelligent collection functions outlined herein. These activities can be facilitated by collector elements (e.g., collector element 58, collectors 32, 34, and 36), where these components can be suitably combined, or consolidated in any appropriate manner, which may be based on particular configuration and/or provisioning needs. For example, in certain example implementations, gateways 28 and 30 may include individual instances of collectors 32, 34, and/or 36. Gateways 28, 30, and 56 can include memory elements for storing information to be used in achieving the intelligent collection activities, as discussed herein. Additionally, gateways 28, 30, and 56 may include a processor that can execute software or an algorithm to perform the intelligent collection operations, as disclosed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 and communication system 50 (and their teachings) are readily scalable and can accommodate a large number of components, as well as more complicated/sophisticated arrangements and configurations. Accordingly, the examples provided should not limit the scope or inhibit the broad teachings of communication system 10 and communication system 50, as potentially applied to a myriad of other architectures.

It is also important to note that the steps in the preceding flow diagrams illustrate only some of the possible signaling scenarios and patterns that may be executed by, or within, communication system 10 and communication system 50. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 and communication system 50 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols (e.g., SNMP, CLI, etc.), communication system 10 and communication system 50 may be applicable to other protocols and arrangements. Moreover, the present disclosure is equally applicable to various technologies, aside from FCAPS and NMS protocols, as these descriptions have only been offered for purposes of discussion. Additionally, although communication system 10 and communication system 50 have been illustrated with reference to particular elements and operations that facilitate the communication process, these elements and operations may be replaced by any suitable architecture or process that achieves the intended functionalities of communication system 10 and communication system 50.

What is claimed is:

1. A method, comprising:
    executing a master scheduling script provided in a network element, the network element configured for exchanging packets with a plurality of end devices in a network environment, wherein the master scheduling script is configured to:
        parse a seed file that contains the plurality of end devices; and
        spawn a collector control script for a selected end device of the plurality of end devices, wherein the spawned collector control script is configured to instruct a collector element to launch a slave collection script to initiate a collection of data from the selected end device, wherein the slave collection script is configured to parse an inventory configuration file (ICF) to gather a set of command line interface (CLI) commands associated with the selected end device;
    receiving the data from the selected end device; and
    communicating the received data to a next destination.

2. The method of claim 1, wherein all of the plurality of end devices contained in the seed file are selected end devices from which respective data is to be retrieved.

3. The method of claim 2, further comprising:
    verifying that an Internet Protocol address of the selected end device in the seed file is reachable by the network element.

4. The method of claim 1, further comprising:
    creating, based on a storage capacity of the network element, one or more archives of the data received from the selected end device and other data received from one or more other selected end devices; and
    communicating each of the one or more archives to a next destination.

5. The method of claim 4, wherein the communicating includes communicating a part number and a total amount of parts being communicated to the next destination.

6. The method of claim 1, wherein the collection script is further configured to:
    parse the inventory configuration file to gather simple network management protocol (SNMP) management information base (MIB) data to be collected from the selected end device.

7. The method of claim 1, wherein the collector element is coincident, collocated, and residing in a same logical element as the network element.

8. The method of claim 1, wherein the collector element is provisioned separately from the network element.

9. The method of claim 1, wherein the network element communicates with the collector element over a secure shell (SSH) connection.

10. One or more non-transitory computer-readable storage media that includes code for execution and when executed by a processor is operable to perform operations comprising:
    executing a master scheduling script provided in a network element, the network element configured for exchanging packets with a plurality of end devices in a network environment, wherein the master scheduling script is configured to:
        parse a seed file that contains the plurality of end devices; and
        spawn a collector control script for a selected end device of the plurality of end devices, wherein the spawned collector control script is configured to instruct a collector element to launch a slave collection script to initiate a collection of data from the selected end device, wherein the slave collection script is configured to parse an inventory configuration file (ICF) to gather a set of command line interface (CLI) commands associated with the selected end device;

receiving the data from the selected end device; and communicating the received data to a next destination.

11. The one or more non-transitory computer-readable storage media of claim 10, wherein the processor is operable to perform further operations comprising:

creating, based on a storage capacity of the network element, one or more archives of the data received from the selected end device and other data received from one or more other selected end devices; and communicating each of the one or more archives to a next destination.

12. The one or more non-transitory computer-readable storage media of claim 10, wherein the collection script is further configured to:

parse the inventory configuration file to gather simple network management protocol (SNMP) management information base (MIB) data to be collected from the selected end device.

13. The one or more non-transitory computer-readable storage media of claim 10, wherein the collector element is coincident, collocated, and residing in a same logical element as the network element.

14. An apparatus configured for exchanging packets with a plurality of end devices in a network environment, comprising:

a memory element configured to store data;

a processor operable to execute instructions associated with the data;

a master scheduling script configured to interface with the memory element and the processor to:

parse a seed file that contains the plurality of end devices; and spawn a collector control script for a selected end device of the plurality of end devices, wherein the spawned collector control script is configured to instruct a collector element to launch a slave collection script to initiate a collection of device-specific data from the selected end device, wherein the memory element is configured to receive the device-specific data from the selected end device, wherein the slave collection script is configured to parse an inventory configuration file (ICF) to gather a set of command line interface (CLI) commands associated with the selected end device; and a transport module configured to communicate the received device-specific data to a next destination.

15. The apparatus of claim 14 wherein the collector element is coincident, collocated, and residing in a same logical element as the apparatus.

16. The apparatus of claim 14 wherein the collector element is further configured to:

parse the inventory configuration file to gather simple network management protocol (SNMP) management information base (MIB) data to be collected from the selected end device.

17. The apparatus of claim 14, wherein the collector element is provisioned separately from the apparatus, and wherein the apparatus communicates with the collector element over a secure shell (SSH) connection.

\* \* \* \* \*